US011645026B2

(12) United States Patent
Sakai

(10) Patent No.: US 11,645,026 B2
(45) Date of Patent: May 9, 2023

(54) IMAGE PROCESSING APPARATUS THAT GENERATES A JOB LOG AFTER RECOVERY FROM POWER-OFF THAT PREVENTS SUCCESSFUL ENDING OF A JOB, METHOD, AND NON-TRANSITORY COMPUTER-READABLE STORAGE MEDIUM FOR STORING PROGRAM

(71) Applicant: Canon Kabushiki Kaisha, Tokyo (JP)

(72) Inventor: Rammaru Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/557,365

(22) Filed: Dec. 21, 2021

(65) Prior Publication Data

US 2022/0206730 A1 Jun. 30, 2022

(30) Foreign Application Priority Data

Dec. 25, 2020 (JP) .............................. JP2020-217370

(51) Int. Cl.
*G06F 3/12* (2006.01)
(52) U.S. Cl.
CPC ............ *G06F 3/1273* (2013.01); *G06F 3/121* (2013.01); *G06F 3/1229* (2013.01); *G06F 3/1259* (2013.01)
(58) Field of Classification Search
CPC ...... G06F 3/1273; G06F 3/121; G06F 3/1229; G06F 3/1259

USPC ......................... 358/1.15, 1.16; 399/10, 9, 24
See application file for complete search history.

(56) References Cited

U.S. PATENT DOCUMENTS

| 6,317,848 B1* | 11/2001 | Sorens | G03G 15/5079 |
| | | | 714/48 |
| 2005/0050261 A1* | 3/2005 | Roehr | G11C 8/12 |
| | | | 711/E12.041 |
| 2015/0022845 A1* | 1/2015 | Roscoe | G06F 3/1234 |
| | | | 358/1.14 |
| 2017/0126925 A1* | 5/2017 | Sasaki | G03G 15/553 |

FOREIGN PATENT DOCUMENTS

JP 2002149382 A 5/2002

* cited by examiner

*Primary Examiner* — Jamares Q Washington
(74) *Attorney, Agent, or Firm* — Venable LLP

(57) ABSTRACT

A first storage unit, in a case of starting an execution of a job, stores job information in a first non-volatile memory; and a second storage unit stores, in a second non-volatile memory that, a consumables usage amount that changes over a course of the execution of the job. When the execution of the job does not successfully end due to an error of the image processing apparatus, after recovering from the error, a job log including a job execution result up until an occurrence of the error is generated using the job information stored in the first non-volatile memory and the consumables usage amount stored in the second non-volatile memory.

14 Claims, 6 Drawing Sheets

FIG. 3

| RECORD NUMBER | 0001 |
|---|---|
| DOCUMENT NAME | REPORT.doc |
| USER NAME | Suzuki |
| JOB START TIME | 2020/10/22 11:00 |
| JOB EXECUTION RESULT | — |
| PAPER TYPE | PLAIN PAPER |
| PAPER SIZE | A4 |
| NUMBER OF PRINTED SHEETS | — |

FIG. 4

| | |
|---|---|
| RECORD NUMBER | 0001 |
| DOCUMENT NAME | REPORT.doc |
| USER NAME | Suzuki |
| JOB START TIME | 2020/10/22 11:00 |
| JOB EXECUTION RESULT | SUCCESSFULLY COMPLETED |
| PAPER TYPE | PLAIN PAPER |
| PAPER SIZE | A4 |
| NUMBER OF PRINTED SHEETS | 6 |

FIG. 6

| RECORD NUMBER | 0001 |
|---|---|
| DOCUMENT NAME | REPORT.doc |
| USER NAME | Suzuki |
| JOB START TIME | 2020/10/22 11:00 |
| JOB EXECUTION RESULT | ABNORMALLY TERMINATED |
| PAPER TYPE | PLAIN PAPER |
| PAPER SIZE | A4 |
| NUMBER OF PRINTED SHEETS | 3 |

IMAGE PROCESSING APPARATUS THAT GENERATES A JOB LOG AFTER RECOVERY FROM POWER-OFF THAT PREVENTS SUCCESSFUL ENDING OF A JOB, METHOD, AND NON-TRANSITORY COMPUTER-READABLE STORAGE MEDIUM FOR STORING PROGRAM

BACKGROUND OF THE INVENTION

Field of the Invention

The present invention relates to an image processing apparatus and a method for executing jobs and a non-transitory computer-readable storage medium for storing a program.

Description of the Related Art

An image processing apparatus such as an inkjet printer or a copying machine that executes an image data print job has a function of storing execution history information (job log) of each job in a non-volatile memory. The job log includes various items such as the job execution user, start time, and job execution result. The number of sheets printed in each job may be used for, for example, a consumables flat-rate service, and therefore, accurate information is required. Japanese Patent Laid-Open No. 2002-149382 describes a technique of updating the contents of a non-volatile memory every time there is a change in an item of a job log.

SUMMARY OF THE INVENTION

The present invention provides an image processing apparatus, method, and program for generating an appropriate job log based on a job execution result even when an error occurs.

The present invention in one aspect provides an image processing apparatus comprising: an execution unit configured to execute a job; a first storage unit configured to, in a case where the execution of the job is started by the execution unit, store job information related to the job in a first non-volatile memory; a second storage unit configured to store, in a second non-volatile memory that is different from a first non-volatile memory, a consumables usage amount that changes over a course of the execution of the job by the execution unit; a first generation unit configured to, in a case where the execution of the job by the execution unit successfully ended, generate a job log using the job information stored in the first non-volatile memory and the consumables usage amount stored in the second non-volatile memory; and a second generation unit configured to, in a case where the execution of the job by the execution unit did not successfully end due to an error of the image processing apparatus, after recovery from the error of the image processing apparatus, generate a job log including a job execution result up until an occurrence of the error using the job information stored in the first non-volatile memory and the consumables usage amount stored in the second non-volatile memory.

According to the present invention, it is possible to generate an appropriate job log based on a job execution result even when an error occurs.

Further features of the present invention will become apparent from the following description of exemplary embodiments with reference to the attached drawings.

BRIEF DESCRIPTION OF THE DRAWINGS

FIG. 3 is a diagram illustrating a start-time job log.

FIG. 4 is a diagram illustrating an end-time job log.

FIG. 6 is a diagram illustrating a recovered job log.

DESCRIPTION OF THE EMBODIMENTS

Figure 1:
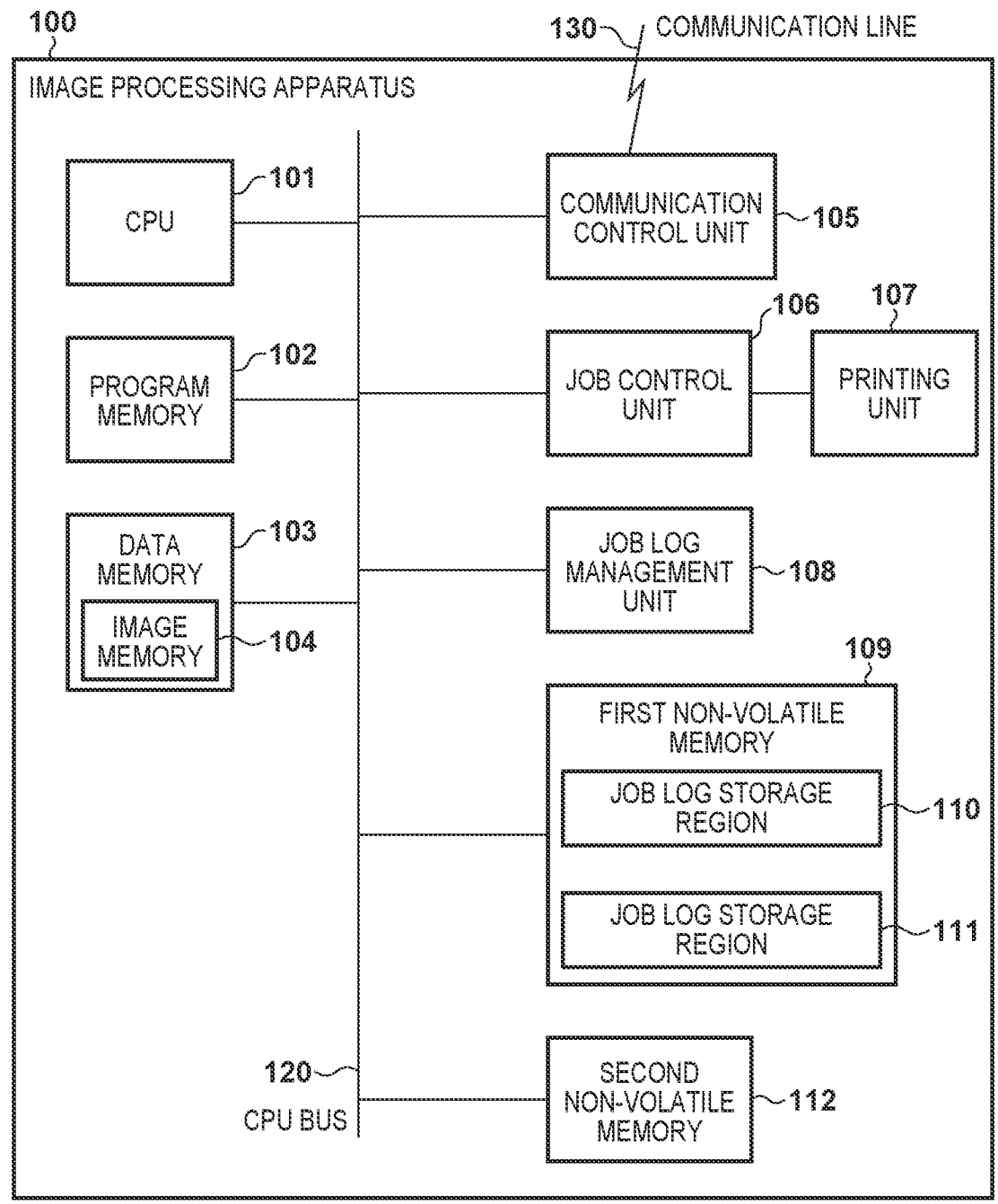
FIG. 1 is a block diagram illustrating a configuration of an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In Japanese Patent Laid-Open No. 2002-149382, the contents of a non-volatile memory are updated when there is a change in any item of a job log. Therefore, if there is a change in the consumables information or the like that changes over the course of the execution of a job, the non-volatile memory is updated on a job-log basis. In this case, if a power-off error or the like occurs while writing a job log to the non-volatile memory, there is a possibility that the consumables information included in the job log may not be stored.

According to one aspect of the present disclosure, it is possible to generate an appropriate job log based on a job execution result even when an error occurs.

FIG. 1 is a block diagram illustrating a configuration of an image processing apparatus 100 according to the present embodiment. The image processing apparatus 100 includes a CPU 101, a program memory 102, a data memory 103, a communication control unit 105, a job control unit 106, a printing unit 107, a job log management unit 108, a first non-volatile memory 109, and a second non-volatile memory 112.

The CPU 101 is a system control unit and controls the image processing apparatus 100 as a whole. The program memory 102 stores a control program to be executed by the CPU 101, an embedded operating system (OS) program, and the like. The data memory 103 includes an image memory 104 for storing program control variables and the like and for holding image data. In the data memory 103, various work buffer regions used during processing of the job control unit 106 is provided. The operation of the image processing apparatus 100 according to the present embodiment is realized, for example, by the CPU 101 reading the program stored in the program memory 102 to the data memory 103 and executing the program. The communication control unit 105 controls data transmission and reception to and from an external unit via a communication line 130. The communication line 130 includes a wired communication line, a wireless communication line, and a communication line in which these are mixed. The communication control unit 105 may operate as an access point configured as software or hardware. The image processing apparatus 100 receives image data and a print job from an external PC, a portable terminal, a server, or the like via the communication control unit 105.

The job control unit 106 managements and executes a job received from an external unit. For example, the job control unit 106 operates as a spooler and sequentially executes a plurality of print jobs retained by a function such as retention printing. When the job is executed, the job control unit 106 acquires image data for printing from the image memory 104 and controls the printing unit 107 to execute the printing process. When executing the job, the job control unit 106 transmits job-related information to the job log management unit 108. The job-related information includes, for example, a print target document name, a user name, and print target paper information. After executing the job, the job control unit 106 transmits the job execution information to the job log management unit 108. The job execution information includes, for example, the job execution result indicating success, failure, and the like and the number of printed sheets on which printing was performed.

The printing unit 107 receives a print command from the job control unit 106 and performs print processing, The printing unit 107 notifies the job control unit 106 each time printing of one sheet is completed. The printing unit 107 may employ various printing methods, and for example, an inkjet printing method that performs printing on a printing medium by ejecting ink droplets from a printhead may be employed.

The job log management unit 108 generates a job log based on the job-related information and the job execution information received from the job control unit 106 and stores the job log in the first non-volatile memory 109. The job log management unit 108 stores the job execution information received from the job control unit 106 in the second non-volatile memory 112. In the present embodiment, the first non-volatile memory 109 and the second non-volatile memory 112 are configured as physically different memories. In the following, description will be given using the number of printed sheets as an example of job execution information.

The timing at which the job log is stored in the first non-volatile memory 109 is at the start of job execution and at the end of job execution or at the time of recovery from the power-off of the image processing apparatus 100. The time of recovery from the power-off of the image processing apparatus 100 includes the restart of the image processing apparatus 100. As illustrated in FIG. 1, in the first non-volatile memory 109, a job log storage region 110 and a job log storage region 111 for storing a job log are separately provided. The job log storage region 110 is used when storing a job log at the start of job execution. The job log storage region 111 is used when storing a job log at the end of job execution. The job log storage region 111 is also used to store the recovered job log at the time of recovery from power-off. In the present embodiment, when a power-off error occurs during execution of a print job, at the time of restarting after the occurrence of the error, the job log management unit 108 generates a job log that reflects the number of sheets on which printing was completed before the occurrence of an error and stores the job log as the recovered job log.

The number of printed sheets is updated and stored in the second non-volatile memory 112 every time printing of one sheet is completed by the printing unit 107. The job log management unit 108 generates a recovered job log using the number of printed sheets stored in the second non-volatile memory 112 at the time of restarting after the occurrence of the error. As described above, the first non-volatile memory 109 and the second non-volatile memory 112 are configured as physically different memories. In the present embodiment, a memory in which the data writing speed is faster than that of the first non-volatile memory 109 is used as the second non-volatile memory 112 and is configured as a memory exclusively for the purpose of storing the number of printed sheets.

The CPU 101 to the data memory 103, the communication control unit 105, the job control unit 106, the job log management unit 108, the first non-volatile memory 109, and the second non-volatile memory 112 are connected to each other so as to be able to transmit and receive data via, a bus 120. The configuration of the image processing apparatus 100 is not limited to the configuration illustrated in FIG. 1 and may include a configuration other than the configuration illustrated in FIG. 1 as appropriate, depending on the functions that the image processing apparatus 100 is capable of executing.

Next, an operation of the job log management unit 108 in the image processing apparatus 100 will be described. For example, in a configuration in which the contents of the job log in the non-volatile memory are updated each time there is a change in an item of the job log, the size of the data to be written to the non-volatile memory at a time increases, and therefore, the write time increases. As the write time increases, it is more likely to be affected by errors in the image processing apparatus 100 that occur during writing. For example, it is assumed that when a power-off error occurs in the image processing apparatus 100, information indicating a job execution result such as the number of printed sheets will not to be stored in the non-volatile memory. Information indicating the job execution result such as the number of printed sheets may be used in various services such as ordering consumables, and if the stored information is not accurate, the user will suffer from unexpected disadvantages. Further, when the time for writing to the non-volatile memory becomes longer, the subsequent processing for storing to the non-volatile memory may not be performed at a predetermined timing.

In addition, at the end of job execution, the job log stored in the non-volatile memory may be moved to another predetermined region in order to use the job log information for subsequent processing. In this case, if a power-off error occurs before deleting the job log stored in the non-volatile memory after copying the job log to the predetermined region, the process of moving the job log to the predetermined region is performed again at the time of recovery from the next power-off error, and as a result, the job log is stored in duplicate. That is, even if the information stored in the non-volatile memory is accurate up until job execution completion, if a power-off error occurs at the above timing, inaccurate information may be used in the service or the like.

In the present embodiment, information that changes over the course of the execution of the job, such as the number of printed sheets, is stored in the second non-volatile memory 112 as necessary. As described above, the second non-volatile memory 112 is configured separately from the first non-volatile memory 109, and the writing speed is taster than that of the first non-volatile memory 109, Further, since the information that changes over the course of the execution of the job, such as the number of printed sheets, is stored as necessary, the hit size to be written to the second non-volatile memory 112 at a time is extremely small. Therefore, regarding the storing of the number of printed sheets, it is possible to increase the robustness against the occurrence of the power-off error.

Figure 2:
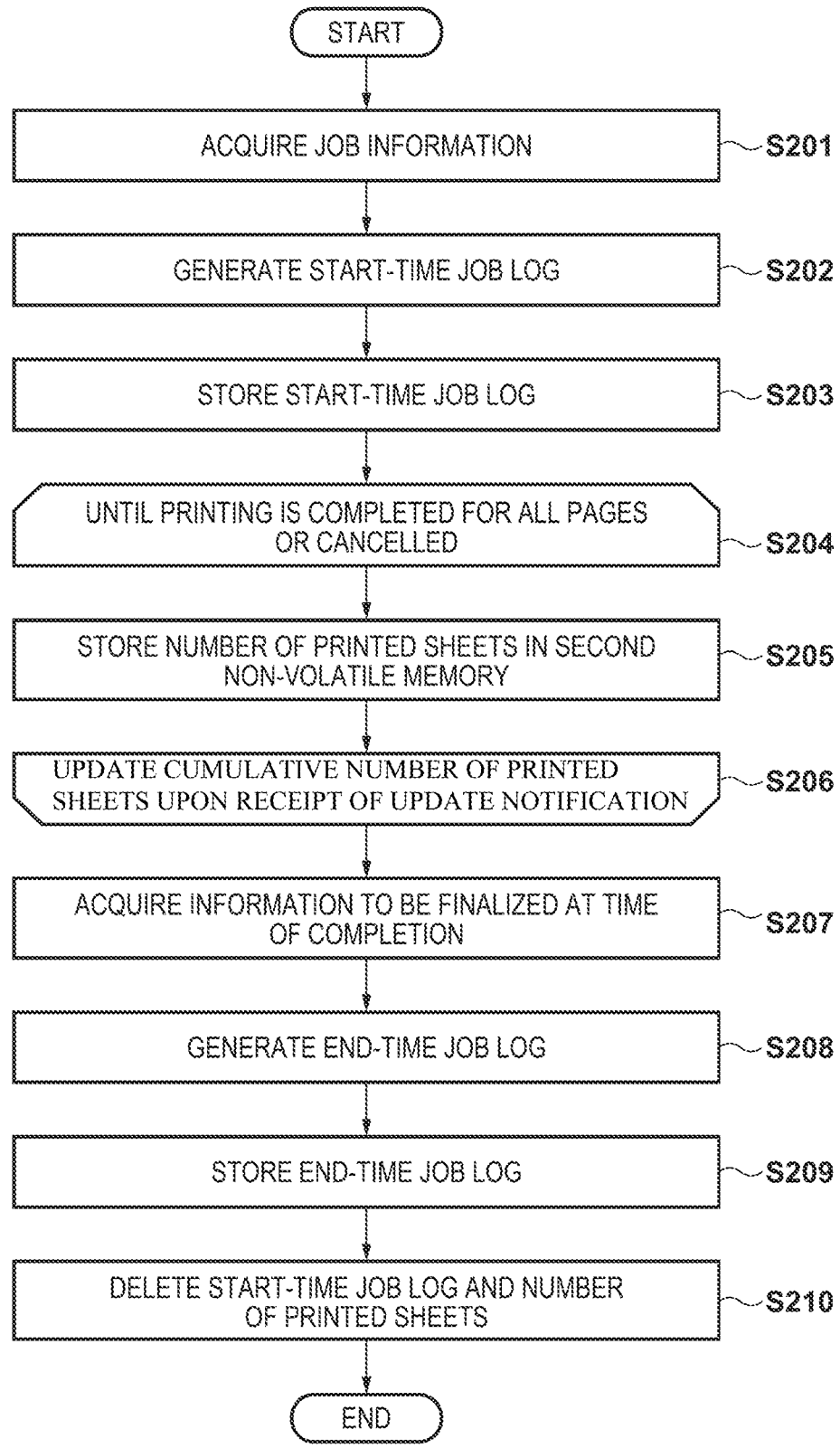
FIG. 2 is a flowchart illustrating job log storage processing.

FIG. 2 is a flowchart illustrating job log storage processing for when printing image data by executing a print job in the present embodiment. The process of FIG. 2 is realized, for example, by the CPU 101 reading the program stored in the program memory 102 to the data memory 103 and executing the program. Further, the process of FIG. 2 is started when the execution of the print job is started. The execution of the print job may be an execution of a print job inputted to the image processing apparatus 100 or may be an execution of a print job stored in the image processing apparatus 100. It may also be an execution of a print job executed by a function such as secure printing.

When the print job is started, the job log management unit 108 receives and acquires, from the job control unit 106, job-related information (job information), such as the document name and the paper size, which are determined at the start of job execution (step S201). The job log management unit 108 assigns a record number for managing the job log to the job information received in step S201 and generates a start-time job log (step S202), then stores the start-time job log in the job log storage region 110 of the First non-volatile memory 109 (step S203).

FIG. 3 is a diagram illustrating an example of a start-time job log. FIG. 3 illustrates the record number, document name, user name, job start time, job execution result, paper type, paper size, and number of printed sheets as items of the start-time job log. The items illustrated in FIG. 3 are only examples, and other items may be included, FIG. 3 illustrates "reportdoc," "Suzuki," "2020 Oct. 22 11:00," "plain paper," and "A4" as information corresponding to the document name, user name, job start time, paper type, and paper size. The information is job information received from the job control unit 106 in step S201. Further, "0001" is assigned as the record number by the job log management unit 108. In addition, the items, job execution result and number of printed sheets are illustrated as blanks because these are information unknown at the start of job execution.

Each of the job log storage regions 110 and 111 can store a plurality of job logs, which can be identified by a record number that is identification information. For example, in the job log storage region 110, in addition to the start-time job log illustrated in FIG. 3, the start-time job log including the job information in which the document name, the user name, the job start time, the paper type, and the paper size are "proposal template.xlsx", "Honda", "2020 Oct. 26 13:00", "plain paper", and "A3" is stored and can be identified by the record number "0002".

After printing of image data is started, every time printing of a sheet is completed, a notification is sent from the printing unit 107 to the job control unit 106, and further, the job log management unit 108 receives an update notification of the number of printed sheets from the job control unit 106. The job log management unit 108 updates the cumulative number of printed sheets for each reception of the update notification of the number of printed sheets and stores it in the second non-volatile memory 112 (step S205). The process of updating the cumulative number of printed sheets is repeated until the printing of this print job is completed on all pages or is canceled halfway (steps S204 to S206).

As described above, in the present embodiment, the number of printed sheets is acquired over the course of job execution, and the information in the second non-volatile memory 112 is updated. With such a configuration, a single write time to the second non-volatile memory 112 is shortened. Further, since the second non-volatile memory 112 is configured separately from the first non-volatile memory 109, even if writing to the second non-volatile memory 112 fails, it is possible to prevent the information of the start-time job log stored in the job log storage region 110 of the first non-volatile memory 109 from being affected.

When printing of the last page in the print job is completed, the job log management unit 108 receives and acquires, from the job control unit 106, information to be finalized at the end of the job. The information finalized at the end of the job is, for example, the job execution result of FIG. 3. The job log management unit 108 combines the received information with the start-time job log stored in the job log storage region 110. Further, the job log management unit 108 calculates the cumulative number of printed sheets at the time of job termination, and combines the calculation result with the start-time job log (step S208). The job log management unit 108 stores, in the job log storage region 111, the job log generated by the combining in step S208 as an end-time job log (step S209), FIG. 4 is a diagram illustrating an example of an end-time job log. The end-time job log is generated by combining the start-time job log with the number of printed sheets finalized at the end of the job. The end-time job log of FIG. 4 is generated by combining the job execution result "successfully completed" and the number of printed sheets "6" with the start-time job log illustrated in FIG. 3. The job log management unit 108 stores the end-time job log in the job log storage region 111 of the second non-volatile memory 112 and then deletes the start-time job log stored in the job log storage region 110 and the information on the number of printed sheets stored in the second non-volatile memory 112 (step S210).

That is, when the job execution is completed successfully without a power-off error occurring, after the processing of FIG. 2 is ended, the job log storage region 111 is in a state in which the end-time job log is stored, and the job log storage region 110 and the second non-volatile memory 112 are in state in which the end-time job log is deleted. Further, for example, when a power-off error occurs and the job execution fails, the process of FIG. 2 ends in the middle of step S205. In this case, the job log storage region 110 is in a state in which the start-time job log is stored, the job log storage region 111 is in a state in which the end-time job log has not yet been stored, and the second non-volatile memory 112 is in a state in which the number of printed sheets up to that point is stored. Further, when the job execution is completed successfully and then a power-off error occurs before the processing of step S210 of FIG. 2, the job log storage region 110 is in a state in which the start-time job log is stored, the job log storage region 111 is in a state in which the end-time job log is stored, and the second non-volatile memory 112 is in a state in which the number of printed sheets after the print completion is stored.

Figure 5:
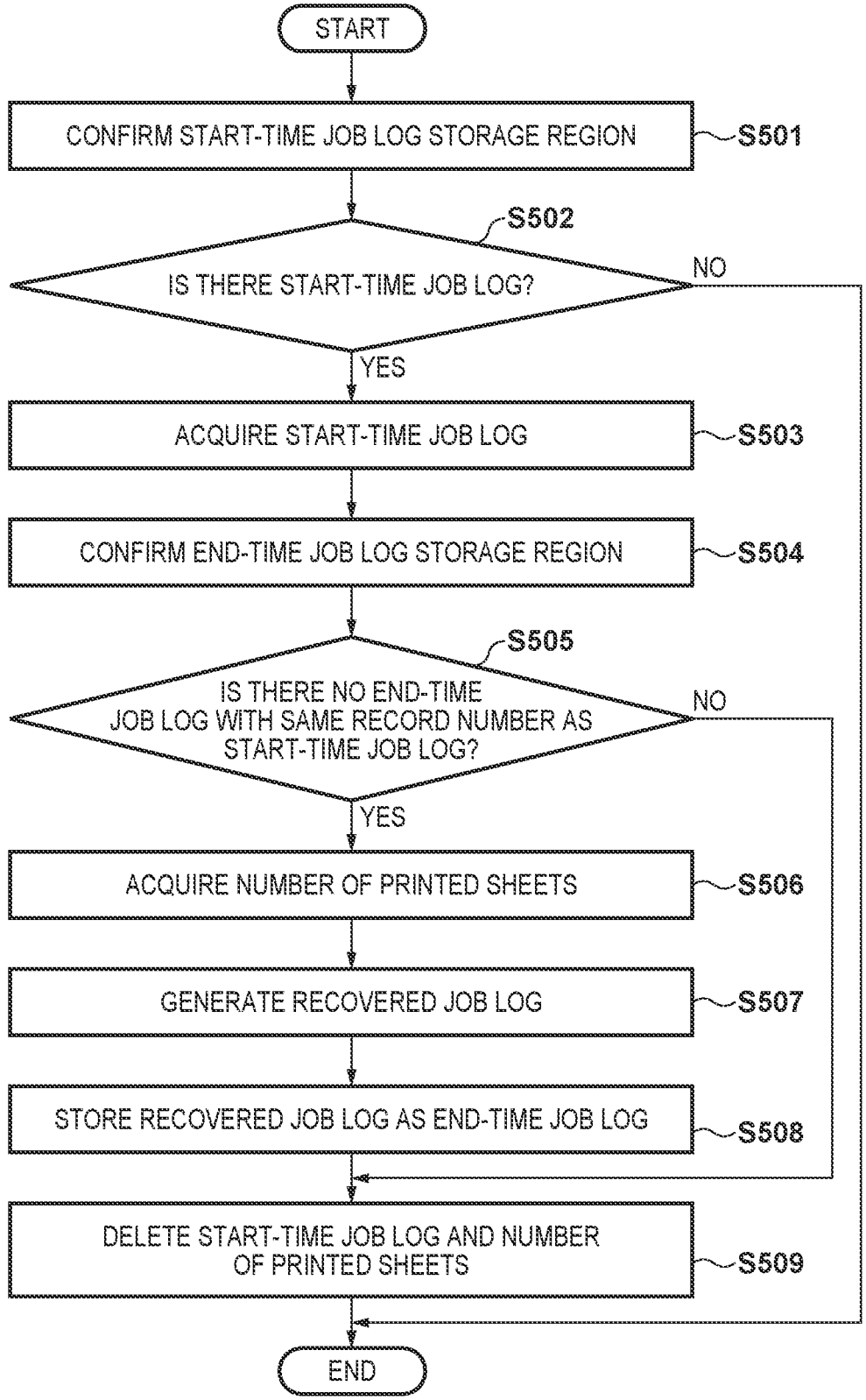
FIG. 5 is a flowchart illustrating job log recovery processing.

FIG. 5 is a flowchart illustrating job log recovery processing after a power-off error has occurred and then the image processing apparatus 100 has recovered. The process of FIG. 5 is realized, for example, by the CPU 101 reading the program stored in the program memory 102 to the data memory 103 and executing the program. The processing of FIG. 5 is executed after a power-off error has occurred and then the power is turned on.

First, the job log management unit 108 confirms the stored information by referring to the job log storage region 110 (step S501). First, the job log management unit 108 determines whether or not there is a start-time job log in the job log storage region 110 (step S502). The case where it is determined that there is no start-time job log in the job log storage region 110 is, for example, when the job execution was completed successfully and the processing of FIG. 2 ended without a power-off error. In this case, the job log management unit 108 ends the processing of FIG. 5 without executing the job log recovery processing to be described later. In addition, it determined in step S502 that the start-time job log does not exist in the job log storage region 110 and then the processing of FIG. 5 is ended not only when the power-off error does not occur, but also when the power-off error occurs after the job execution was completed successfully and the processing of FIG. 2 is ended.

Meanwhile, when it is determined in step S502 that there is a start-time job log in the job log storage region 110, the job log management unit 108 acquires the start-time job log from the job log storage region 110 (step S503). The job log management unit 108 confirms the stored information by referring to the job log storage region 111 (step S504). Then, the job log management unit 108 determines whether or not there is an end-time job log with the same record number as the start-time job log in the job log storage region 111 (step S505). The case where it is determined that there is an end-time job log with the same record number is, for example, when the processing for storing the end-time job log in step S209 was completed, but a power-off error occurred prior to deletion processing in step S210. Therefore, the job log management unit 108 identifies the timing at which the power-off error has occurred as the timing after step S209 and prior to step S210. In this case, the job log management unit 108 does not execute the process of recovering the job log, deletes the start-time job log stored in the job log storage region 110 and the number of printed sheets stored in the second non-volatile memory 112 (step S509) and ends the process of FIG. 5. After FIG. 5 is ended, the end-time job log stored in the job log storage region 111 is moved to another memory region and is used to execute various services such as consumables ordering service.

Meanwhile, the case where it is determined in step S505 that there is no end-time job log with the same record number as the start-time job log in the job log storage region 111 is, for example, when a power-off error has occurred in the middle of step S205. Therefore, the job log management unit 108 identifies the timing at which the power-off error has occurred as the timing prior to step S209. In such a case, since the end-time job log is not stored, it is necessary to acquire the number of sheets for which printing was executed up until the power-off error occurred and then recover the job log.

As the recovery processing, the job log management unit 108 acquires the number of printed sheets from the second non-volatile memory 112 (step S506). The job log management unit 108 combines the number of printed sheets acquired in step S506 with the start-time job log stored in the job log storage region 110 (step S507). The job log management unit 108 stores, in the job log storage region 111, the job log generated (recovered) by the combining in step S507 as an end-time job log (step S508). The job log stored in step S508 is hereinafter treated as an end-time job log.

FIG. 6 is a diagram illustrating an example of a recovered job log. FIG. 6 illustrates a job log recovered when a power-off error occurred and the job abnormally terminated at the timing when the number of sheets for which printing was executed is three. As illustrated in FIG. 6, the recovered job log is generated by combining the job execution result "abnormally terminated" and the number of printed sheets "3" with the start-time job log illustrated in FIG. 3.

After the recovered job log is stored as an end-time job log in the job log storage region 111, the job log management unit 108 deletes the start-time job log stored in the job log storage region 110 and the number of printed sheets stored in the second non-volatile memory 112 (step S509) and ends the process of FIG. 5. After FIG. 5 is ended, the end-time job log (corresponds to the recovered job log) stored in the job log storage region 111 is moved to another memory region and is used to execute various services such as consumables ordering service.

As described above, according to the present embodiment, over the course of job execution, the number of printed sheets is stored as necessary in the second non-volatile memory 112, which is configured separately from the first non-volatile memory 109 that stores the job log. In other words, it can be said that the information for recovering the job log is stored in the second non-volatile memory 112 as necessary. In the present embodiment, when the job is completed successfully and the processing of FIG. 2 is ended, the information stored in the job log storage region 110 and the second non-volatile memory 112 is deleted. With such a configuration, it is possible to identify the timing of occurrence of the power-off error based on the storage status of the start-time job log and the storage status of the end-time job log. For example, if the start-time job log is not stored (step S502: NO), it can be identified that the power-off error has not occurred (or has occurred after FIG. 2 has ended). Further, for example, when the start-time job log is stored and the end-time job log is also stored, the timing of occurrence of the power-off error can be identified to after the job was successfully completed and before the process in step S210. Further, for example, when the start-time job log is stored but the end-time job log is not stored, the timing of occurrence of the power-off error can be identified as during job execution.

In the present embodiment, the job log recovery processing is performed in accordance with the identified timing of occurrence of the power-off error. For example, when it is identified that the timing at which the power-off error has occurred is during job execution, the job log is recovered using the number of printed sheets stored in the second non-volatile memory 112. On the other hand, for example, when it is identified that the occurrence timing of the power-off error is after the job was successfully completed and is prior to the process in step S210, the job log recovery is not performed. With such a configuration, it is possible to recover the job log that reflects the number of printed sheets up to the occurrence of the power-off error and prevent recovering the job log in duplicate.

In the present embodiment, the first non-volatile memory 109 and the second non-volatile memory 112 are described as memories configured separately from each other. However, the job log storage region 110, the job log storage region 111, and the storage region of the information for recovering the job log may be configured independently of each other in one physical non-volatile memory.

Further, in the present embodiment, the number of printed sheets is explained as an example of the job execution information used as information for recovering the job log. However, other information may be used as long as it is a usage amount of a consumable that can change over the course of job execution. For example, it may be information on ink droplets. In this case, for example, the dot count number may be stored in the second non-volatile memory 112.

In the present embodiment, a power-off error is described as an error that occurs in the image processing apparatus 100. However, it may be another error as long as the error requires the restart of the image processing apparatus 100. For example, the operation of the present embodiment may be applied in the case of a system error, which requires the re-reading of a program by restarting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217370, filed Dec. 25, 2020, which is hereby incorporated by reference herein in its entirety.

What is claimed is:

1. An image processing apparatus comprising:
an execution unit configured to execute a job;
a first storage unit configured to, in a case where the execution of the job is started by the execution unit, store job information related to the job in a first non-volatile memory;
a second storage unit configured to store, in a second non-volatile memory that is different from a first non-volatile memory, a consumables usage amount that changes over a course of the execution of the job by the execution unit;
a first generation unit configured to, in a case where the execution of the job by the execution unit successfully ended, generate a job log using the job information stored in the first non-volatile memory and the consumables usage amount stored in the second non-volatile memory;
a second generation unit configured to, in a case where the execution of the job by the execution unit did not successfully end due to power-off of the image processing apparatus, after recovery from the power-off of the image processing apparatus, generate a job log including a job execution result up until an occurrence of the power-off using the job information stored in the first non-volatile memory and the consumables usage amount stored in the second non-volatile memory; and
a first deletion unit configured to, in a case where the execution of the job by the execution unit successfully ended, delete the job information stored by the first storage unit from the first non-volatile memory and delete the consumables usage amount stored by the second storage unit from the second non-volatile memory.

2. The image processing apparatus according to claim 1, further comprising: a third storage unit configured to store, in the first non-volatile memory, a job log generated by the first generation unit.

3. The image processing apparatus according to claim 1, further comprising: a determination unit configured to, at a time of recovery from the power-off of the image processing apparatus, determine whether or not to perform a generation of a job log by the second generation unit based on information stored in the first non-volatile memory.

4. The image processing apparatus according to claim 3, wherein the determination unit, in a case where the job information stored by the first storage unit is present in the first non-volatile memory, determines to perform a generation of a job log by the second generation unit.

5. The image processing apparatus according to claim 4, wherein the determination unit, in a case where the job log stored by the third storage unit is not present in the first non-volatile memory, determines to perform a generation of a job log by the second generation unit.

6. The image processing apparatus according to claim 5, wherein the determination unit, in a case where the job log stored by the third storage unit is present in the first non-volatile memory, determines not to perform a generation of a job log by the second generation unit.

7. The image processing apparatus according to claim 5, wherein whether or not the job log stored by the third storage unit is present in the first non-volatile memory is determined based on identification information of the job information.

8. The image processing apparatus according to claim 3, further comprising: a second deletion unit configured to, in a case where it is determined by the determination unit that a generation of a job log by the second generation unit is to be performed and then a generation of a job log by the second generation unit is performed, delete the job information stored by the first storage unit from the first non-volatile memory and delete the consumables usage amount stored by the second storage unit from the second non-volatile memory.

9. The image processing apparatus according to claim 1, wherein the first non-volatile memory and the second non-volatile memory are hardware that is different from each other.

10. The image processing apparatus according to claim 1, wherein a write speed of the second non-volatile memory is faster than a write speed of the first non-volatile memory.

11. The image processing apparatus according to claim 1, wherein the recovery from the power-off of the image processing apparatus is a restart of the image processing apparatus.

12. The image processing apparatus according to claim 1, wherein the consumables usage amount includes a number of printed sheets.

13. A method executed in an image processing apparatus, the method comprising:
executing a job;

in a case of starting the executing of the job, storing job information related to the job in a first non-volatile memory;

storing, in a second non-volatile memory that is different from a first non-volatile memory, a consumables usage amount that changes over a course of the executing of the job in a case where the executing of the job successfully ends, generating a job log using the job information stored in the first non-volatile memory and the consumables usage amount stored in the second non-volatile memory;

in a case where the executing of the job does not successfully end due to power-off of the image processing apparatus, after recovering from the power-off of the image processing apparatus, generating a job log including a job execution result up until an occurrence of the power-off using the job information stored in the first non-volatile memory and the consumables usage amount stored in the second non-volatile memory; and in a case where the execution of the job by the execution unit successfully ended, deleting the job information stored by the first storage unit from the first non-volatile memory and deleting the consumables usage amount stored by the second storage unit from the second non-volatile memory.

14. A non-transitory computer-readable storage medium storing a program for causing a computer to:

execute a job;

in a case of starting the executing of the job, store job information related to the job in a first non-volatile memory;

store, in a second non-volatile memory that is different from a first non-volatile memory, a consumables usage amount that changes over a course of the executing of the job in a case where the executing of the job successfully ends, generate a job log using the job information stored in the first non-volatile memory and the consumables usage amount stored in the second non-volatile memory;

in a case where the executing of the job does not successfully end due to power-off of the image processing apparatus, after recovering from the power-off of the image processing apparatus, generate a job log including a job execution result up until an occurrence of the power-off using the job information stored in the first non-volatile memory and the consumables usage amount stored in the second non-volatile memory; and in a case where the execution of the job by the execution unit successfully ended, delete the job information stored by the first storage unit from the first non-volatile memory and delete the consumables usage amount stored by the second storage unit from the second non-volatile memory.

* * * * *